United States Patent
Xu et al.

(10) Patent No.: US 10,779,357 B2
(45) Date of Patent: *Sep. 15, 2020

(54) METHOD FOR AVOIDING HANDOVER FAILURE

(71) Applicant: Samsung Electronics Co., Ltd., Gyeonggi-do (KR)

(72) Inventors: Lixiang Xu, Beijing (CN); Hong Wang, Beijing (CN); Huarui Liang, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,390

(22) Filed: Sep. 13, 2019

(65) Prior Publication Data
US 2020/0008265 A1    Jan. 2, 2020

Related U.S. Application Data

(63) Continuation of application No. 13/542,247, filed on Jul. 5, 2012, now Pat. No. 10,420,166.

(30) Foreign Application Priority Data

Jul. 5, 2011   (CN) .......................... 2011 1 0202644

(51) Int. Cl.
*H04W 36/00*   (2009.01)
*H04W 76/30*   (2018.01)
*H04W 8/08*   (2009.01)

(52) U.S. Cl.
CPC ............ *H04W 76/30* (2018.02); *H04W 8/082* (2013.01); *H04W 36/0033* (2013.01)

(58) Field of Classification Search
CPC . H04W 80/04; H04W 36/18; H04W 36/0011; H04W 36/14; H04W 92/045; H04W 36/0027
See application file for complete search history.

(56) References Cited

U.S. PATENT DOCUMENTS

| 8,971,290 B2 | 3/2015 | Liang |
| 9,924,413 B2 | 3/2018 | Adjakple |
| 2002/0154638 A1 | 10/2002 | Shahrier |
| 2008/0130585 A1 | 6/2008 | Park et al. |

(Continued)

FOREIGN PATENT DOCUMENTS

| CN | 102045798 | 5/2011 |
| CN | 102056143 | 5/2011 |

(Continued)

OTHER PUBLICATIONS

Panasonic, "LIPA Mobility Support with Standalone LGW", TD S2-112332, SA WG2 Meeting #85, May 16-20, 2011.

(Continued)

*Primary Examiner* — Michael J Moore, Jr.
*Assistant Examiner* — Prenell P Jones
(74) *Attorney, Agent, or Firm* — The Farrell Law Firm, P.C.

(57) ABSTRACT

Methods for avoiding handover failure are provided. The method includes determining, by a source Base Station (BS), to perform a handover of a User Equipment (UE); determining, by the source BS, whether a target BS connects with a user plane node serving the UE at the source BS; and releasing resources, when the target BS does not connect with the user plane node serving the UE at the source BS.

20 Claims, 10 Drawing Sheets

(56) References Cited

U.S. PATENT DOCUMENTS

| | | |
|---|---|---|
| 2008/0285492 A1 | 11/2008 | Vesterinen |
| 2009/0149180 A1 | 6/2009 | Kitazoe |
| 2010/0046476 A1 | 2/2010 | Qiu |
| 2010/0169498 A1 | 7/2010 | Palanki et al. |
| 2010/0195621 A1 | 8/2010 | Kekki et al. |
| 2010/0238799 A1 | 9/2010 | Sebire |
| 2011/0045834 A1 | 2/2011 | Kim et al. |
| 2011/0096660 A1 | 4/2011 | Ikeda et al. |
| 2011/0103310 A1 | 5/2011 | Stojanovski |
| 2011/0218003 A1 | 9/2011 | Qiu |
| 2011/0228750 A1 | 9/2011 | Tomici |
| 2011/0249559 A1 | 10/2011 | Sun |
| 2012/0110197 A1 | 5/2012 | Miklos et al. |
| 2012/0182912 A1 | 7/2012 | Wafta et al. |
| 2012/0182972 A1 | 7/2012 | Guan et al. |
| 2012/0207137 A1 | 8/2012 | Zhou et al. |
| 2012/0214445 A1 | 8/2012 | Stojanovski |
| 2012/0258768 A1 | 10/2012 | Takahashi et al. |
| 2012/0269168 A1 | 10/2012 | Qiu |
| 2013/0003697 A1 | 1/2013 | Adjakple et al. |
| 2013/0003698 A1 | 1/2013 | Olvera-Hernandez et al. |
| 2013/0028237 A1 | 1/2013 | Cheng et al. |
| 2013/0042011 A1 | 2/2013 | Sugizaki |
| 2013/0089076 A1 | 4/2013 | Olvera-Hemandez et al. |
| 2013/0188604 A1 | 7/2013 | Chin |
| 2013/0301610 A1 | 11/2013 | Ali |
| 2013/0308527 A1 | 11/2013 | Chin |
| 2015/0092665 A1 | 4/2015 | Choi |

FOREIGN PATENT DOCUMENTS

| | | |
|---|---|---|
| CN | 102076036 | 5/2011 |
| CN | 102076038 | 5/2011 |
| JP | 2011-087089 | 4/2011 |
| JP | 2014-512762 | 5/2014 |
| KR | 1020090111434 | 10/2009 |
| KR | 1020110038571 | 4/2011 |
| WO | WO 2008/131401 | 10/2008 |
| WO | WO 2008/132163 | 11/2008 |
| WO | WO 2011/035740 | 3/2011 |
| WO | WO 2011/054283 | 5/2011 |
| WO | WO 2011/129070 | 10/2011 |

OTHER PUBLICATIONS

Huawei, Hisilicon, "LHN Identification using L-GW@CN Address", TD S2-112783, 3GPP TSG SA WG2 Meeting #85, May 16-20, 2011.

3rd Generation Partnership Project; Technical Specification Group Services and System Aspects; LIPA Mobility and SIPTO at the Local Network; (Release 11), 3GPP TR 23.859 V0.2.0, Apr. 2011.

Huawei, Hisilicon, "LIPA PDN Connection Deactivation way Forward", S2-105609, 3GPP TSG SA WG2 Meeting #82, Nov. 15-19, 2010.

ZTE, "Mobility Handling in Connected Mode using LHN-ID", S2-113064, SA WG2 Meeting #86, Jul. 11-15, 2011.

European Search Report dated Apr. 22, 2015 issued in counterpart application No. 12807232.9-1854.

3rd Generation Partnership Project; Technical Specification Group Services and System Aspects; General Packet Radio Service (GPRS) Enhancements for Universal Terrestrial Radio Access Network (E-UTRAN) Access (Release 10), 3GPP TS 23.401 V10.4.0, Jun. 2011, 15 pages.

Catt, "Key Issue of LIPA Deactivation", S2-112832, SA WG2 Meeting #85, May 16-20, 2011, 6 pages.

ZTE, "LIPA Mobility Based on Direct X2/Iurh", S2-112321, SA WG2 Meeting #85, May 16-20, 2011, 3 pages.

Japanese Office Action dated May 16, 2016 issued in counterpart application No. 2014-518825, 9 pages.

Chinese Office Action dated Oct. 8, 2016 issued in counterpart application No. 201110202644.5, 26 pages.

Huawei, Hisilicon, "LHN Identification using the LHN-ID", S2-112548, 3GPP TSG SA WG2 Meeting #85, May 16-20, 2011, 2 pages.

European Search Report dated May 16, 2018 issued in counterpart application No. 12807232.9-1214, 8 pages.

Alcatel-Lucent, "Key Issue #L4: LIPA Deactivation", S2-113244, SA WG2 Meeting #86, Jul. 11-15, 2011, 6 pages.

ZTE, "HO Decision and LIPA Bearer Handling", S2-113065, SA WG2 Meeting #86, Jul. 11-15, 2011, 4 pages.

Catt, "Key Issue of LIPA Deactivation", S2-112786, SA WG2 Meeting #85, May 16-20, 2011, 2 pages.

Japanese Office Action dated Nov. 5, 2019 issued in counterpart application No. 2019-000235, 7 pages.

Chinese Office Action dated Mar. 6, 2020 issued in counterpart application No. 201810797113.7, 26 pages.

METHOD FOR AVOIDING HANDOVER FAILURE

PRIORITY

This application is a Continuation application of U.S. patent application Ser. No. 13/542,247, which was filed in the U.S. Patent and Trademark Office on Jul. 5, 2012, and claims priority under 35 U.S.C. § 119(a) to Chinese Patent Application No. 201110202644.5, which was filed in the State Intellectual Property Office of the Peoples Republic of China on Jul. 5, 2011, the entire disclosure of which is incorporated herein by reference.

1. TECHNICAL FIELD OF THE INVENTION

The present invention relates generally to mobile communication, and more particularly, to a method for avoiding handover failure in a mobile communication system.

2. BACKGROUND OF THE INVENTION

System Architecture Evolution (SAE) is the core network architecture of the 3$^{rd}$ Generation Partnership Project's (3GPP's) Long Term Evolution (LTE) wireless communication standard. Specifically, SAE is an evolution of a General Packet Radio Service (GPRS) core network, which reduces time delay and costs for operators, and provides a higher user data rate, higher system capacity, and better coverage.

Figure 1:
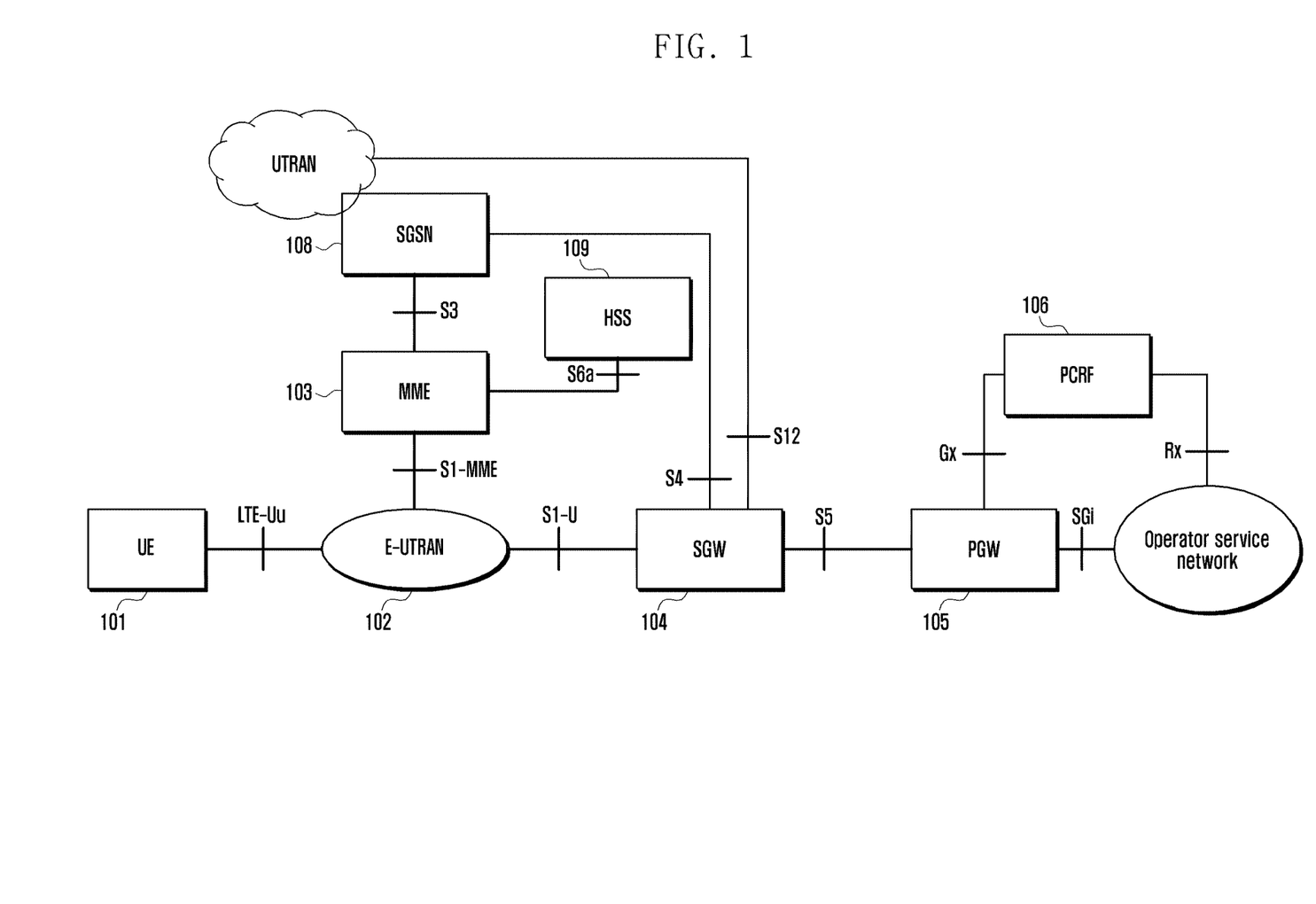
FIG. 1 is a diagram illustrating a conventional SAE system.

FIG. 1 is a diagram illustrating a conventional SAE system.

Referring to FIG. 1, the conventional SAE system includes a User Equipment (UE) 101, i.e., a terminal device, for receiving data, an Evolved Universal Terrestrial Radio Access Network (E-UTRAN) 102, a Mobility Management Entity (MME) 103, a Service GateWay (SGW) 104, a Packet data network GateWay (PGW) 105, a Policy and Charging Rule Function (PCRF) controller 106, a Serving GPRS Support Node (SGSN) 108, and a Home Subscriber Server (HSS) 109.

The E-UTRAN 102 is a wireless access network including a macro Evolved NodeB (eNB) that provides an interface for accessing the wireless network for the UE 101.

The MME 103 is responsible for managing mobile contexts, session contexts, and security information of the UE 101, and the SGW 104 is mainly used for providing functions of a user plane. Alternatively, the MME 103 and the SGW 104 may be embodied a single physical entity.

The PGW 105 is responsible for charging and legal monitoring, etc., and may also be embodied in a single physical entity with the SGW 104. The PCRF 106 provides Quality of Service (QoS) policies and charging criterions.

The SGSN 108 is a network node device for providing routing for the transmission of data in the Universal Mobile Telecommunications System (UMTS).

The HSS 109 is a home sub-system of the UE 101, for protecting user information, such as a current location, an address of a server node, user security information, and packet data context of the UE 101.

Along with enhancements of a service data rate of the UE 101, operators provide a new technology, i.e., Selected IP Traffic Offload (SIPTO). That is, when accessing a specific service, the UE 101 switches to an access point from the wireless access network, which is closer, in the movement procedure, to effectively reduce cost for the transmission network, and provide better service experiences for high data rate.

More specifically, 3GPP presents the network-supported SIPTO and the ability of Local Internet Protocol Access (LIPA). In the SIPTO, when the UE 101 accesses the Internet or other extra networks through a Home evolved NodeB (HeNB), Home NodeB (HNB), or a macro eNB, the network may select or re-select a user plane node which is closer to the wireless access network for the UE 101.

Although LIPA provides that when the UE 101 accesses a home network or an intra-company network through the HeNB or HNB, and the LIPA is executed, a user plane node close to the HNB or in the HeNB/HNB access network may be selected or re-selected for the UE 101. The user plane node may be a core network device or a gateway. The user plane node may be a SGW, PGW, or a Local GateWay (LGW) for the SAE system, and may be a SGSN or Gateway GPRS Support Node (GGSN) for the UMTS system.

Figure 2:
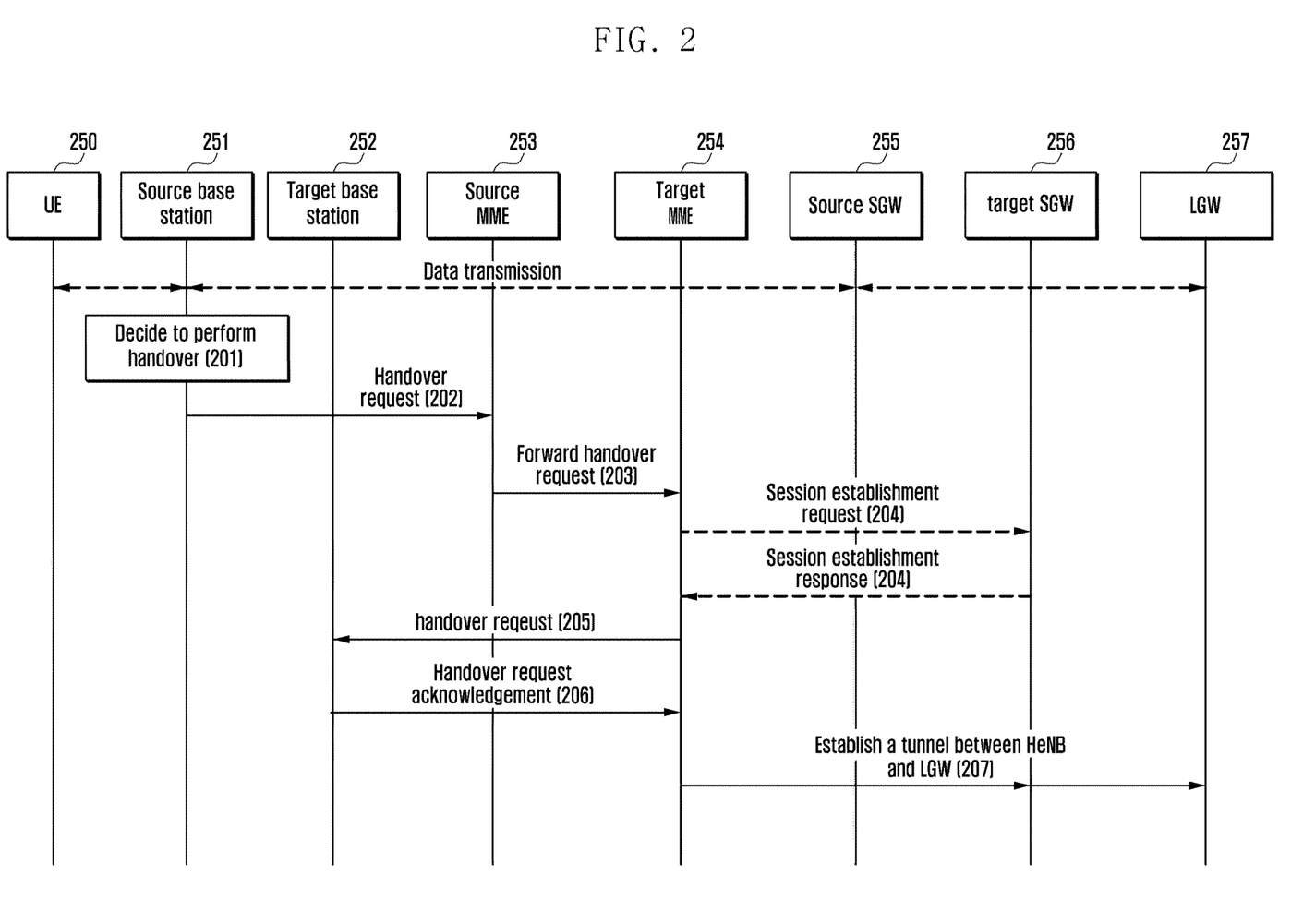
FIG. 2 is a signal flow diagram illustrating a handover operation in a conventional SIPTO and LIPA.

FIG. 2 is a signal flow diagram illustrating a handover operation in a conventional SIPTO and LIPA.

Referring to FIG. 2, a source Base Station (BS) 251 decides to perform a handover of a UE 250 in step 201.

In step 202, the source BS sends a handover request to a source MME 253. The handover request includes information of a target BS 252, such as an IDentity (ID) of the target BS 252, or a target Tracking Area Identity (TAI), and further includes information such as a target Closed Subscriber Group (CSG) or handover type.

In step 203, the source MME 253 sends a forward handover request to a target MME 254. The forward handover request includes information of the target BS 252, etc., obtained from the handover request.

In step 204, if re-selecting an SGW for the UE 250, the target MME 254 performs a session establishing process with the re-selected target SGW 256. Accordingly, step 204 is not executed if the re-selection of the SGW for the UE 250 is not required.

In step 205, the target MME 254 sends a handover request to the target BS 252, and in step 206, the target BS 252 sends a handover request acknowledgement message to the target MME 254.

In step 207, the target MME 254 updates carrier information according to the target BS 252, with which the UE 250 switches, which specifically includes the target MME 254 requesting the establishment of a user plane tunnel between the target BS 252 and an LGW 257, to ensure the handover of UE 250 from the source BS 251 to the target BS 252.

Using the conventional handover procedure illustrated in FIG. 2, there are three common situations that result in handover failure and/or a waste of signaling/wireless resources.

Situation one: The target BS 252 and source BS 251 belong to different local HeNB networks. Thus, the target BS and source BS connect to different LGWs 257. As illustrated in FIG. 2, because the target BS 252 and source BS 251 connect to different LGWs 257, the handover fails. Further, although the target MME 254 may determine the handover failure when establishing the user plane tunnel, and thus, releases the established or occupied wireless resources, too many signaling resources and wireless resources have already been occupied, thereby wasting signaling and wireless resources.

Situation 2: The target BS 252 and source BS 251 belong to a same local HeNB network. However, the target BS 252 and source BS 251 connect to different LGWs 257, e.g., the target BS 252 and source BS 251 belong to different sub-networks, also resulting in the handover failure and the wasting of the signaling and wireless resources.

Situation 3: The target BS 252 and source BS 251 belong to a same local HeNB network, and the target BS 252 and source BS 251 may connect to a same LGW 257. However, the list of LGWs, with which the target BS 252 and source BS 251 connect is not the same, e.g., when the target BS 252 does not connect to the LGW 257 serving UE 250 at the source end, this also results in the handover failure and the wasting of the signaling and wireless resources.

Although, the problems in the conventional handover are described above with reference to an S1 handover procedure, if the source BS triggers an X2 handover process, the X2 handover process may fail, and the MME would not determine that the handover will not succeed until receiving a path switch request message, also wasting the signaling and wireless resources.

Furthermore, similar handover problems also exist in UMTS.

Basically, the above-described handover failure refers to the handover failure of the LIPA carrier. If a UE merely receives a LIPA service, the whole handover process performed according to the conventional handover will fail. However, if the UE simultaneously receives the LIPA service and non-LIPA service, the handover of the non-LIPA service performed according to the conventional handover flow may succeed, while the handover of the LIPA service will fail.

SUMMARY OF THE INVENTION

Accordingly, the present invention has been made to solve the above-described problems occurring in the prior art, and to provide at least the advantages described below.

Accordingly, an aspect of the present invention is to provide a method for avoiding handover failure and excessive resource waste, resulting from a failure of the handover process.

In accordance with an aspect of the present invention a method for avoiding handover failure is provided. The method includes determining, by a source Base Station (BS), to perform a handover of a User Equipment (UE); determining, by the source BS, whether a target BS connects with a user plane node serving the UE at the source BS; and releasing resources, when the target BS does not connect with the user plane node serving the UE at the source BS.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

In accordance with an embodiment of the present invention, a method for avoiding handover failure includes determining whether a target BS connects with a user plane node serving a UE at a source BS, when the source BS decides to perform a handover of the UE, and releasing resources, if not. More specifically, embodiments of the present invention release resources when the target BS does not connect with a user plane node serving the UE at the source BS, when deciding to perform handover of the UE, rather than releasing the sources after a handover failure, as described above in the background. When the target BS does not connect with the source user plane node, the bearer to be transmitted through the source user plane node in the subsequent handover process will fail, and the resources should be released. The problem of resource waste resulting from not releasing the resources until after the handover failure can be avoided by releasing the resources sooner, i.e., after determining that the target BS does not connect with the user plane node served the UE at the source BS.

The source BS determines whether the target BS connects with the user plane node served the UE at the source BS according to information exchanged between the source BS and the target BS. The information exchanged between the source BS and the target BS includes at least one of information of their local networks, information of their local sub-networks, and information of user plane nodes, with which the source BS and the target BS respectively connect.

The information of the local networks includes Local HeNB Networks IDentifiers (LHN IDs). The information of the local sub-networks includes the identities of their sub-networks. The information of the connected user plane nodes may be the information of the connected LGWs. As an example, the embodiments of the present invention will be described below using the connected user plane nodes as the LGWs.

Figure 3:
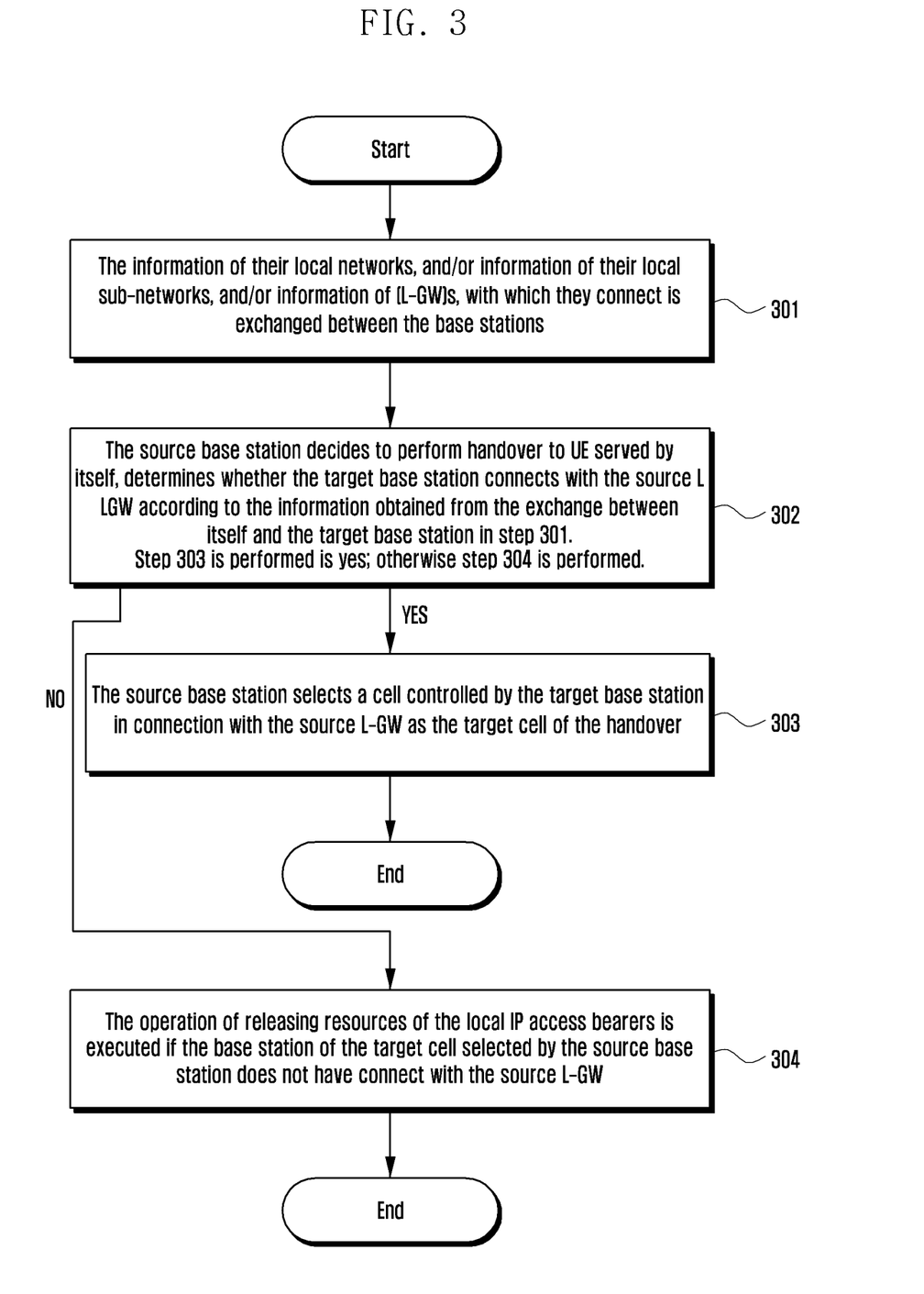
FIG. 3 is a flow chart illustrating a handover method in accordance with an embodiment of the present invention.

FIG. 3 is a flow chart illustrating a handover method in accordance with an embodiment of the present invention.

Referring to FIG. 3, in Step 301, a source BS and a target BS exchange at least one of information of their local networks, information of their local sub-networks, and information of LGWs, with which they connect. For example, the information of the local networks includes LHN IDs, and the information of the local sub-networks includes identities of their sub-networks.

Further, there may be one or multiple connected LGWs. If there are multiple connected LGWs, the information of the connected LGWs includes information of the multiple LGWs, such as identities or IP addresses of the connected LGWs. The IP addresses of the LGWs may be the IP addresses of LGW control planes, the IP addresses of the LGWs in a core network, or the IP addresses of the LGWs in the local networks.

In step 302, the source BS decides to perform a handover of UE served by itself, determines whether the target BS connects with the LGW currently connected with the source BS, based on the information exchanged between itself and the target BS in step 301.

For example, if the information obtained in step 301 is the information of the local network of the target BS, and the local HeNB network of the source BS is different from that of the target BS; the source BS concludes that the LGW connected with the source BS is different from that of the target BS because one LGW belongs to a single local HeNB network.

If the information obtained in block 301 includes the information of the local sub-network of the BS and/or information of the connected LGWs, and the local HeNB of the source BS is the same as that of the target BS, the source BS determines whether the source BS and target BS connect to different LGWs based on the information of the local sub-networks of the source BS and target BS and/or information of connected LGWs.

When the target BS is connected with the LGW currently connected with the source BS in step 302, the source BS selects a cell controlled by the target BS as the target cell of the handover in step 303.

However, when the target BS is not connected with the LGW currently connected with the source BS in step 302, the resources of the local IP access bearers are released, if the BS of the target cell selected by the source BS is not connected with the LGW connected with the source BS in step 304. For example, the source BS triggers the deactivation process of the LIPA service, or the source BS sends a message to the source MME, and the source MME triggers the deactivation process of the LIPA service. Alternatively, the source BS or the source MME sends a message to the LGW, and the LGW triggers the deactivation process of the LIPA service.

Figure 4:
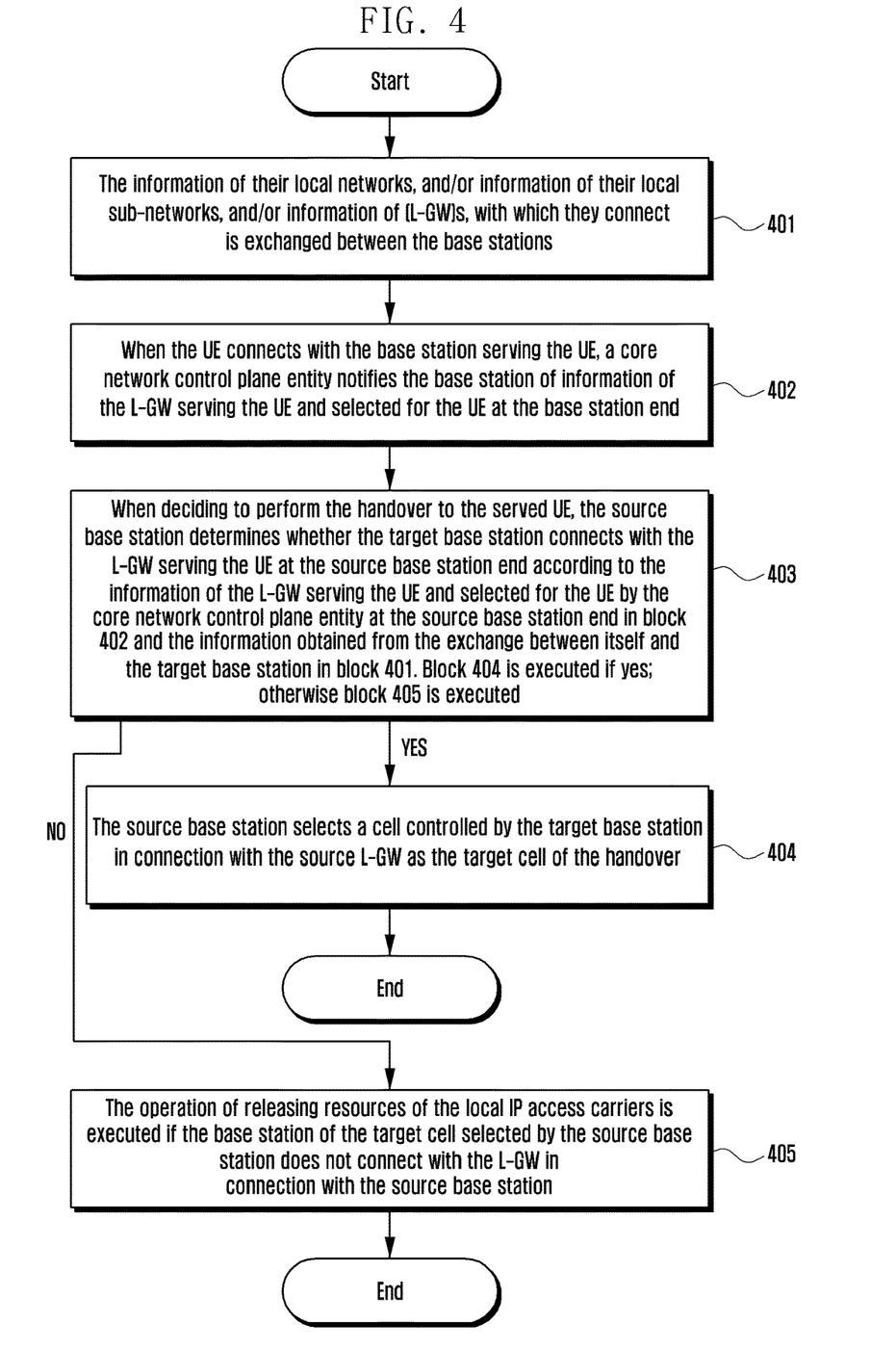
FIG. 4 is a flow chart illustrating a handover method in accordance with an embodiment of the present invention.

FIG. 4 is a flow chart illustrating a handover method in accordance with an embodiment of the present invention.

Referring to FIG. 4, in step 401 a source BS and a target BS exchange information as described above with reference to step 301.

In step 402, when a UE connects with the BS serving the UE, a core network control plane entity notifies the BS of information of the LGW selected for serving the UE at the BS end. For example, the core network control plane entity may be the MME or the SGSN. Further, the information of the LGW may be an identity or an IP address of the LGW, and the IP address of the LGW may be the IP address of the LGW control plane, the IP address of the LGW in the core network, or the IP address of the LGW in the local network.

In step 403, when deciding to perform the handover to the served UE, the source BS determines whether the target BS is connected with the LGW serving the UE at the source BS end, based on the information of the LGW selected for serving the UE by the core network control plane entity at the source BS end in step 402 and the information obtained in step 401.

When the target BS is connected with the LGW serving the UE at the source BS, the source BS selects a cell controlled by the target BS in connection with the source LGW as the target cell of the handover in step 404.

However, when the target BS is not connected with the LGW serving the UE at the source BS, the resources of the local IP access carriers are released, if the BS of the target cell selected by the source BS is not connected with the LGW connected with the source BS in step 405.

Figure 5:
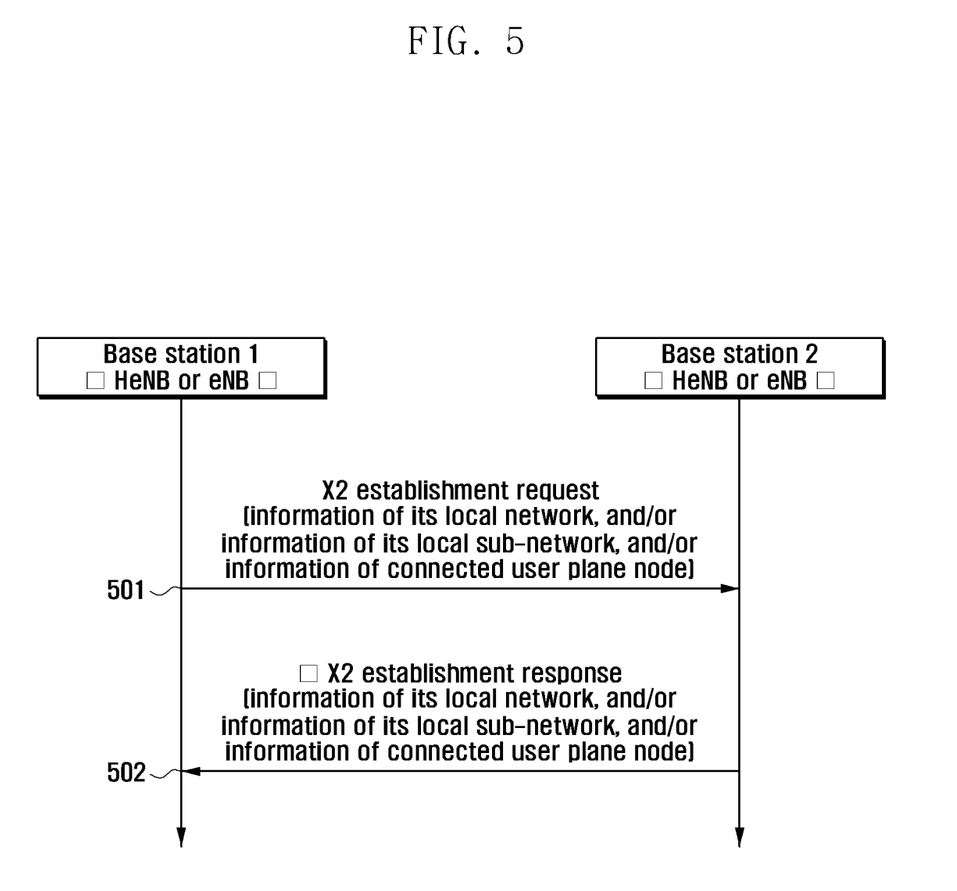
FIG. 5 is a signal flow diagram illustrating a process for exchanging information between BSs in accordance with an embodiment of the present invention.

FIG. 5 is a signal flow diagram illustrating a process for exchanging information between BSs in accordance with an embodiment of the present invention.

Refer to FIG. 5, in step 501, BS 1 (e.g., HeNB1 or eNB1) sends an X2 setup request message to BS 2 (e.g., HeNB2 or eNB2). For example, the X2 setup request message includes at least one of the information of the local network of BS 1, the information of the local sub-network of BS 1, and the information of the LGW, with which BS 1 connects.

In step 502, BS 2 sends an X2 setup response message to BS 1. For example, the X2 setup response message includes at least one of the information of the local network of BS 2, the information of the local sub-network of BS 2, and the information of the LGW, with which BS 2 connects.

Although FIG. 5 is described with reference to an LTE system as an example, the method therein is also applicable to other systems.

For example, in a UMTS system, the process for exchanging the information, for example the information of the their local networks, the information of their local sub-networks, and/or the LGWs, with which they connect in the establishment process between the two BSs (e.g., HNB or RNC) through a Iur interface or an Iurh interface is similar to that of FIG. 5.

When the information of the local network of a BS, the information of the local sub-network of the BS, or the LGW, with which the BS connects is updated, the BS notifies an adjacent BS of the updated information.

Figure 6:
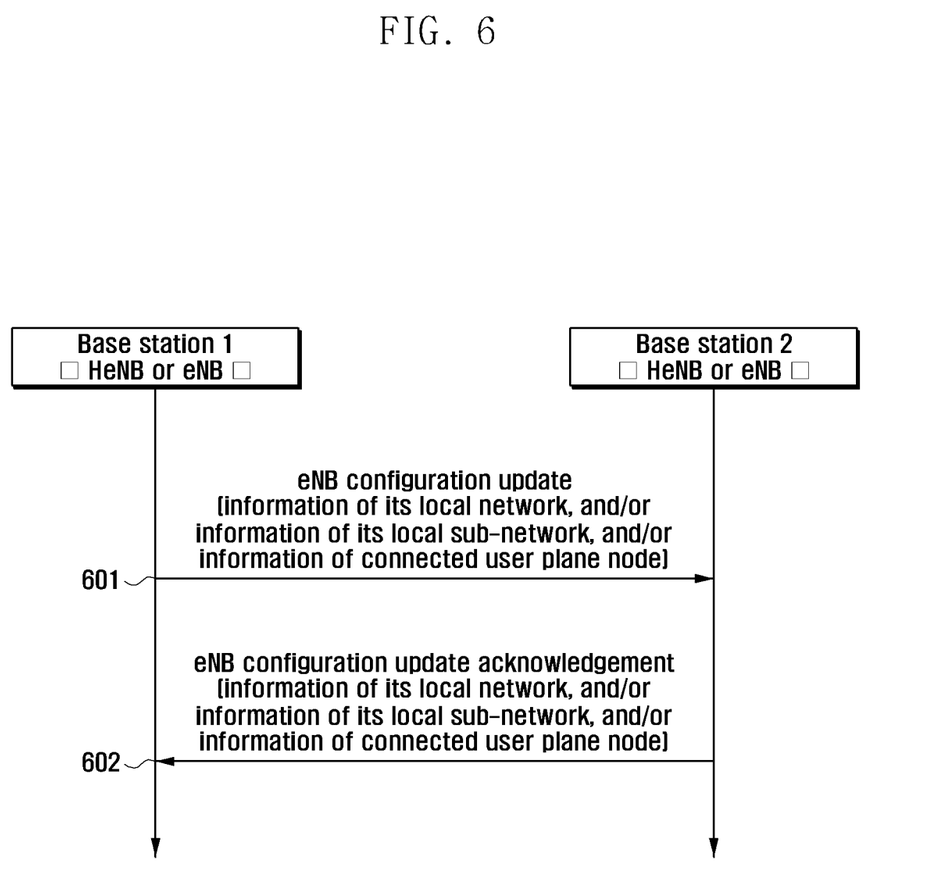
FIG. 6 is a signal flow diagram illustrating a process for a BS sending updated information to an adjacent BS in accordance with an embodiment of the present invention.

FIG. 6 is a signal flow diagram illustrating a process for a BS sending updated information to an adjacent BS in accordance with an embodiment of the present invention.

Referring to FIG. 6, in step 601, BS 1 (e.g., HeNB1 or eNB1) sends an eNB configuration update message to BS 2 (e.g., HeNB2 or eNB2). For example, the eNB configuration update message includes at least one of the information of the local network of BS 1, the information of the local sub-network of BS 1, and the LGW, with which BS1 connects.

In step 602, BS 2 sends an eNB configuration update acknowledgement message to BS 1.

Figure 7:
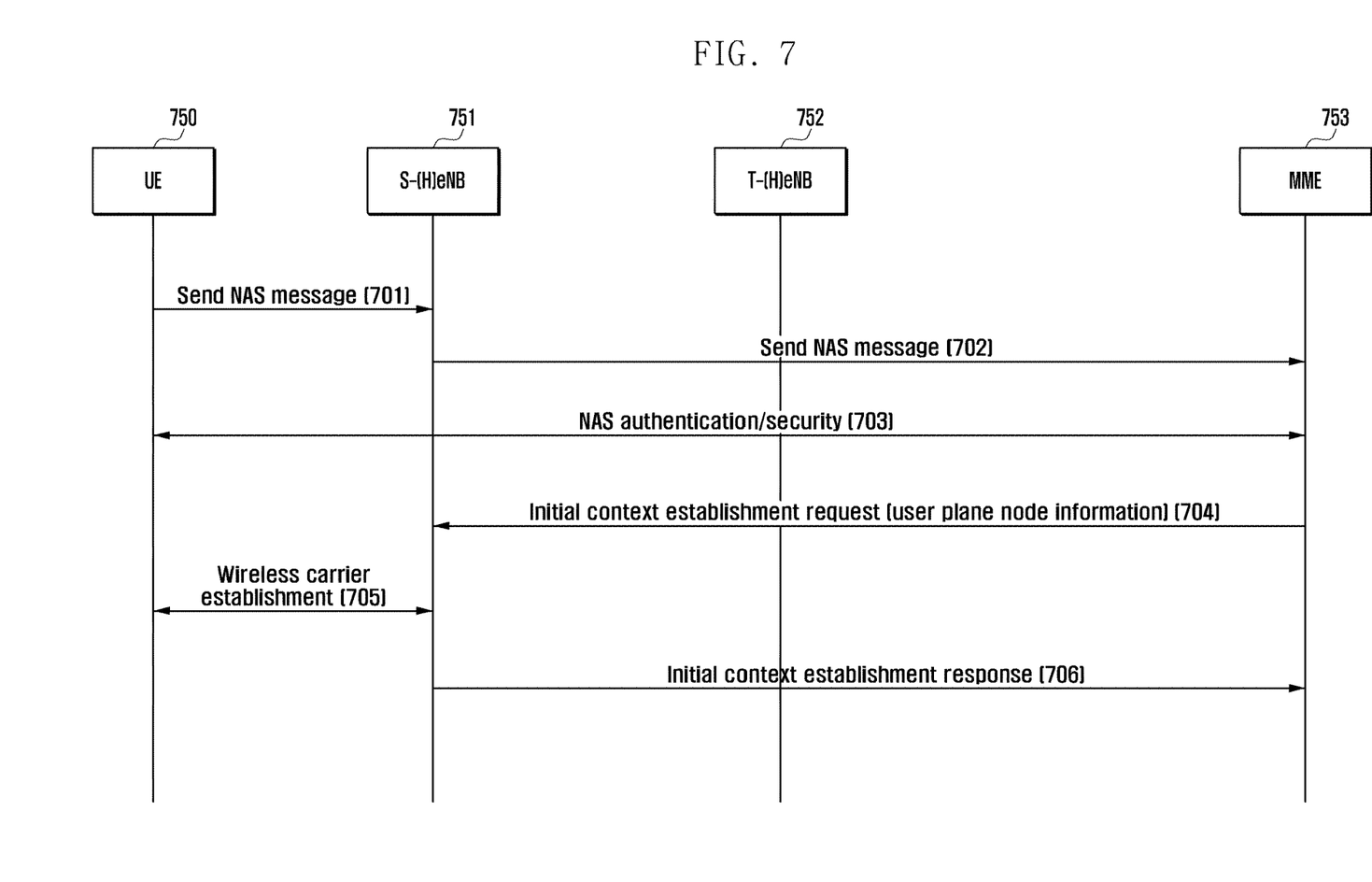
FIG. 7 is a signal flow diagram illustrating a process for an MME sending information of an LGW selected for a UE to a BS in accordance with an embodiment of the present invention.

FIG. 7 is a signal flow diagram illustrating a process for an MME sending information of an LGW selected for a UE to a BS in accordance with an embodiment of the present invention.

Referring to FIG. 7, in step 701, The UE 750 sends a Non Access Stratum (NAS) message, such as an Attach message or Packet Data Network (PDN) connection request message, to the S-HeNB 751.

In step 702, the S-HeNB 751 sends the NAS message received from the UE 750 to the MME 753 through an S1 Access Protocol (AP) message. In the situation with the HeNB GW deployed, the S-HeNB 751 sends the S1 AP message to the MME 753 through the HeNB GW.

In step 703, the MME 753 performs the NAS authentication/security process between itself and the UE 750, after receiving the NAS message. Specific methods for performing the NAS authentication/security process are known in the art.

Further, the authentication and NAS security for activating integrity protection is performed when there is no UE context of the UE 750 in the network, when there is no integrity protection of the Attach request in steps 701 and 702, or when the integrity authentication fails; otherwise the process is optional. When the NAS security algorithm is changed, the NAS security establishment is performed in step 703.

The MME 753 continues with the Attach process when skipping the authentication and security establishment process or accepting the authentication failure, if the MME 753 is configured with the emergency Attach supporting no authentication IMSI, and the UE 750 indicates that the Attach type is emergency.

In step 704, the MME 753 sends an initial context setup request message to the S-HeNB 751. Specifically, with the HeNB GW deployed, the MME 753 sends the initial context setup request message to the S-HeNB 751 through the HeNB GW.

As for the LIPA service, the core network selects the LGW serving the UE 750 for the UE 750 with a method based on the Radio Access Network (RAN), Domain Name System (DNS), or other methods. However, the specific method for selecting the LGW is not the focus of these embodiments of the present invention, and detailed descriptions thereof are omitted here.

The initial context setup message includes the information of the LGW selected for the UE, such as the identity or IP address of the LGW. After receiving the initial context setup request message, the S-HeNB 751 saves the received information of the LGW.

In step 705, after receiving the initial context setup request message, the S-HeNB 751 establishes a wireless bearer with the UE 750.

In step 706, the S-HeNB 751 sends an initial context setup response message to the MME 753.

With the HeNB GW deployed, the initial context setup response message is sent to the HeNB GW, and the HeNB GW sends the initial context setup response message to the MME 753.

Accordingly, in a UMTS system, the SGSN that notifies the BS of the information of the LGW, such as the identity or IP address of the LGW, selected by the core network for the UE through the RAB allocation request message, when the UE accesses the BS.

Further, the source BS is notified of the information of the user plane node selected for serving the UE at the source BS end through an Evolved Radio Access Bearer (E-RAB) setup message. This replaces the initial context setup request message with the E-RAB setup request message and replaces the initial context setup response message with the E-RAB setup response message.

Figure 8:
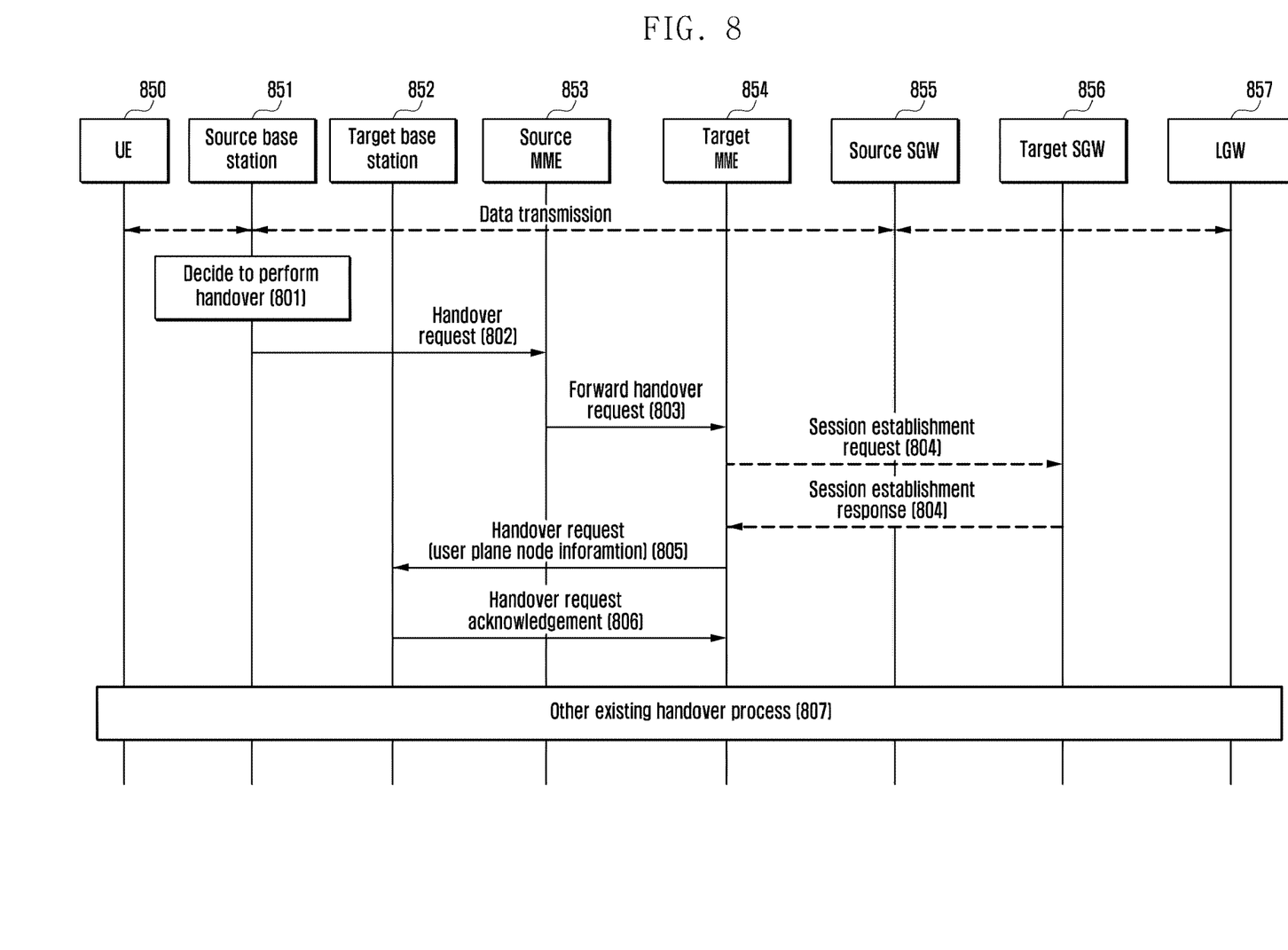
FIG. 8 is a signal flow diagram illustrating a process for an MME sending information of an LGW selected for a UE to a BS in accordance with an embodiment of the present invention.

FIG. 8 is a signal flow diagram illustrating a process for an MME sending information of an LGW selected for a UE to a BS in accordance with an embodiment of the present invention.

Referring to FIG. 8, the source BS 851 decides to make a handover in step 801.

In step 802, the source BS 851 sends a handover request to the source MME 853. For example, the handover request includes information of a target BS 852, such as the ID and Tracking Area ID (TAI) of the target BS 852 and may further include information such as the target CSG or a handover type.

In step 803, the source MME 853 sends a forward handover request to the target MME 854. The forward handover request includes the information of the target BS 852 obtained from the handover request. The message may further include information of the LGW 857 selected for the UE 850 at the source end, such as the identity or IP address of the LGW 857.

In step 804, if re-selecting the SGW for the UE 850, the target MME 854 performs a session establishment process with the re-selected target SGW 856. If the SGW for the UE 850 is not re-selected, step 804 is not executed.

In step 805, the target MME 854 sends a handover request to the target BS 852. The handover request message includes the information of the user plane node selected for the UE 850, such as the information of the LGW 857. The information of the LGW 857 may be the identity or IP address of the LGW 857. The target BS 852 saves the received information of the user plane node, such as the information of the LGW 857.

In step 806, the target BS 852 sends a handover request acknowledgement message to the target MME 854.

In step 807, other existing handover processes continue.

Accordingly, in the UMTS system, the SGSN notifies the BS of the information of the user plane node selected for the UE by the core network, such as the information of the LGW through a relocation request message when the UE accesses the BS for the first time through a relocation process. The information of the LGW includes the identity or IP address of the LGW. The detailed technical descriptions are omitted here.

Figure 9:
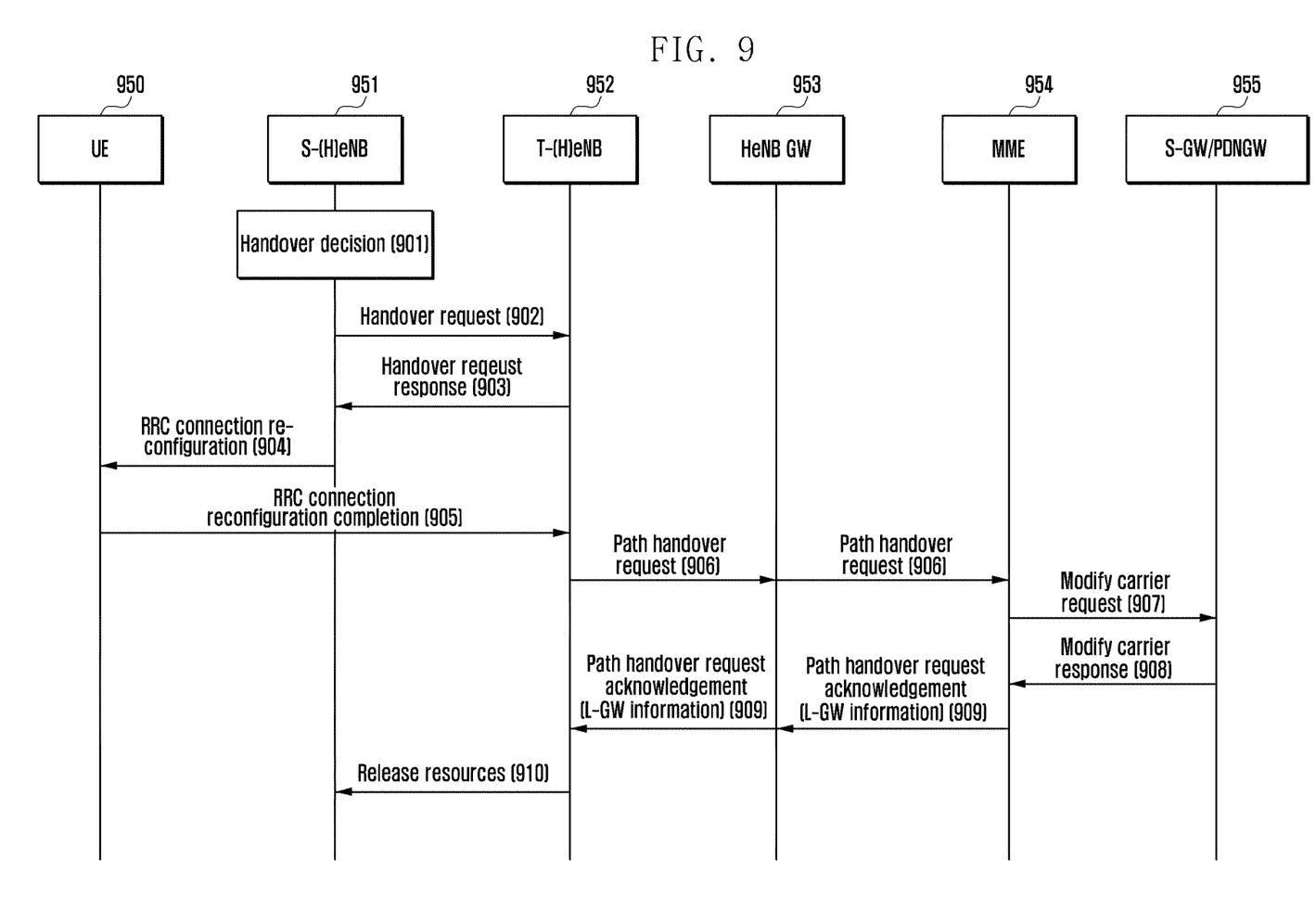
FIG. 9 is a signal flow diagram illustrating a process for the MME sending information of LGW selected for the UE to a BS in accordance with an embodiment of the present invention.

FIG. 9 is a signal flow diagram illustrating a process for the MME sending information of LGW selected for the UE to a BS in accordance with an embodiment of the present invention.

Referring to FIG. 9, in step 901, the S-HeNB 951 makes a handover decision.

In step 902, the S-HeNB 951 sends a handover request message to a T-HeNB 752.

In step 903, the T-HeNB 952 sends a handover request response message to the S-HeNB 751.

In step 904, the S-HeNB 951 sends an RRC connection re-configuration message to the UE 950, requesting the UE 950 to perform the handover.

In step 905, after finishing the handover, the UE 950 sends an RRC connection re-configuration completion message to the T-HeNB 952.

In step 906, the T-HeNB 952 sends a path switch request message to an HeNB GW 953, and the HeNB GW 953 sends the path switch request message to an MME 954.

In this step, the T-HeNB 952 may directly send the path switch request message to the MME 954, if the T-HeNB 952 does not access the MME 954 through the HeNB GW 953.

In step 907, the MME 954 sends a modification bearer request message to an SGW/PDN GW 955.

In step 908, after finishing the modification of the bearer of the UE 950, the SGW/PDN GW 955 sends a modification bearer response message to the MME 954.

In step 909, the MME 954 sends a path switch request acknowledgement message to the HeNB GW 953, which sends the path switch request acknowledgement message to the T-HeNB 952. In this step, the MME 954 directly sends the path switch request acknowledgement message to the T-HeNB 952, if the T-HeNB 952 does not access the MME 954 through the HeNB GW 953.

For example, the path switch request acknowledgement includes the information of the LGW selected for the UE 950. The information of the LGW 950 may be the identity or IP address of the LGW 950. The T-HeNB 952 saves the received information of the user plane node, such as the information of the LGW 950.

In step 910, the T-HeNB 952 sends a resource release message to the S-HeNB 951, after receiving the path switch request acknowledgement message.

In the UMTS system, the source BS notifies the target BS of the information of the LGW selected for the UE by the core network using a relocation request message or handover request message, when the UE accesses the BS for the first time through an optimized relocation process. The information of the LGW includes the identity or IP address of the LGW.

Figure 10:
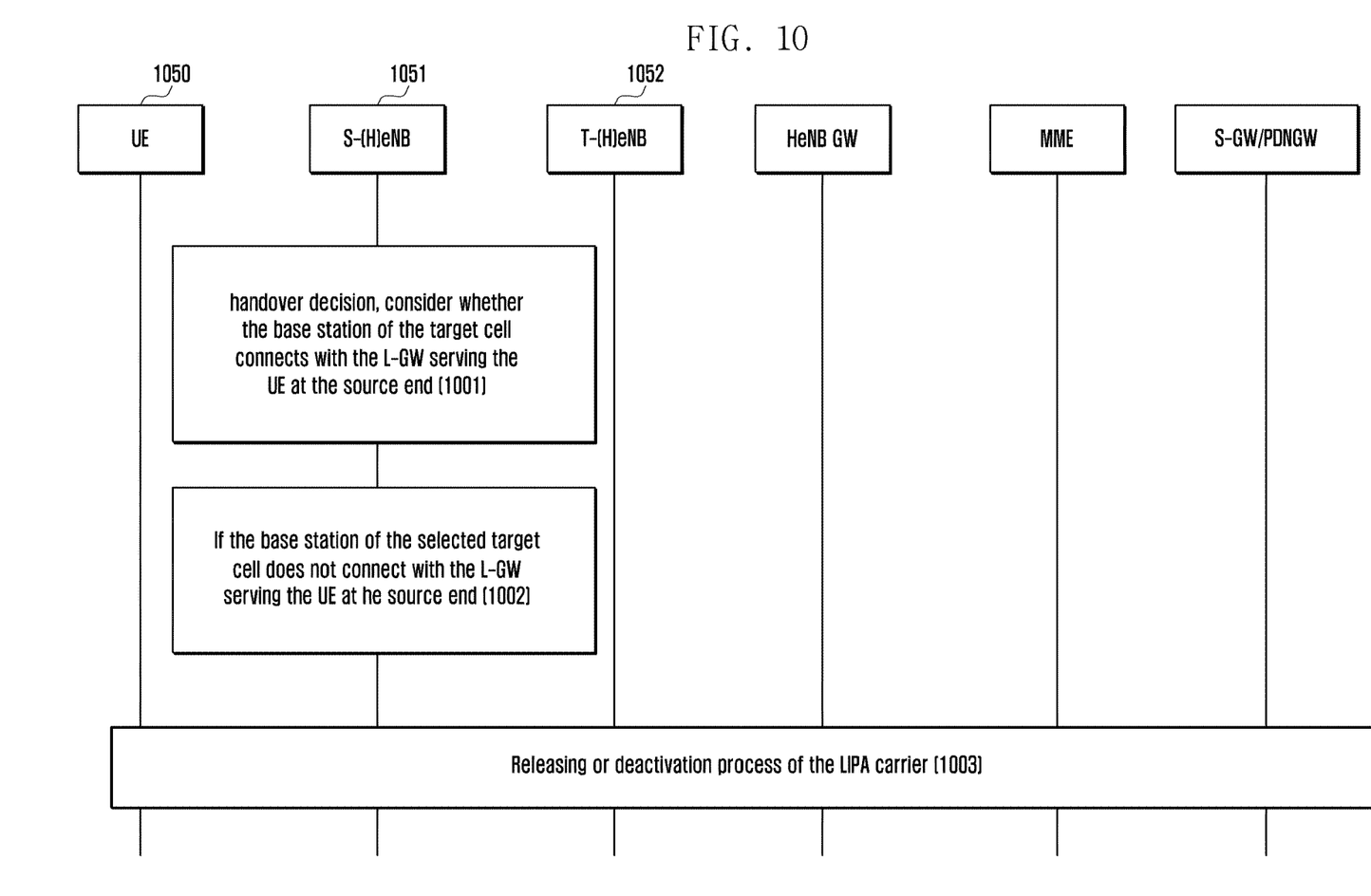
FIG. 10 is a signal flow diagram of illustrating a process for deciding to perform handover in accordance with an embodiment of the present invention.

FIG. 10 is a signal flow diagram of illustrating a process for deciding to perform handover in accordance with an embodiment of the present invention.

Refer to FIG. 10, in step 1001, an S-HeNB 1051 makes a handover decision. The S-HeNB 1051 may consider whether the target T-HeNB 1052 of the target cell connects with an LGW currently serving a UE 1050, when selecting the target cell.

Whether target T-HeNB 1052 of the target cell connects with the LGW currently serving the UE 1050, is described above.

In step 1002, if the target T-HeNB 1052 of the selected target cell does not connect with the LGW serving the UE 1050 at the source end, the S-HeNB 1051 releases the resources, such as triggers the release or deactivation process of the LIPA service. Alternatively, the S-HeNB 1051 sends a message, such as an E-RAB release indication to the source MME, and the source MME triggers the deactivation process of the LIPA service.

Alternatively, the source BS or MME sends a message to the LGW, and the LGW triggers the deactivation process of the LIPA service. Other deactivation processes may be adopted, which does not affect the main contents of the present invention.

In accordance with the above-described embodiments of the present invention, a source BS determines whether a target BS connects with a user plane node, such as an LGW, which serves the UE at the source BS end, when deciding to perform a handover of the UE. If a result of the determination is no, the LIPA bearer handover will likely fail, and the LIPA bearer resources are released. That is, the occupied signaling and wireless resources are released in advance, rather than being released after the handover failure, as described in the background. Accordingly, the above-described embodiments of the present invention prevent resource waste and improve system performance.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method performed by a source base station (BS) in a wireless communication system, the method comprising:

transmitting, to a target BS, first information corresponding to the source BS, the first information including information associated with a local home network and information associated with a sub-network;

receiving, from the target B S, second information corresponding to the target B S, the second information including information associated with a local home network and information associated with a sub-network;

determining to perform a handover of a terminal from the source BS to the target BS;

identifying whether the local home network identified by the first information and the local home network identified by the second information are same based on the first information and the second information; and releasing a local internet protocol access (LIPA) cc packet data network (PDN) connection for the terminal in response to the determination, unless the local home network identified by the first information and the local home network identified by the second information are same.

2. The method of claim 1, wherein the second information further includes information on user plane nodes with which the target BS connects.

3. The method of claim 2, further comprising:
receiving a notification message comprising information on a local gateway (LGW) serving the terminal.

4. The method of claim 3, wherein the identifying further comprises:
identifying whether to release the LIPA PDN connection for the terminal based on the information on the LGW serving the terminal.

5. The method of claim 3, wherein the receiving the notification message comprises:
receiving a handover request message in case that the terminal initially accesses the source BS via an S1 handover; and
receiving a path switch request acknowledgement message in case that the terminal initially accesses the source BS via an X2 handover.

6. The method of claim 3, wherein the second information is received in an X2 setup request message.

7. The method of claim 3, further comprising:
notifying an adjacent BS of updated information in case that the second information updates.

8. The method of claim 1, further comprising:
triggering a deactivation process of a LIPA service based on the first information and the second information, in response to the handover of the terminal.

9. The method of claim 1, further comprising:
transmitting, to a source mobility management entity (MME), a handover request message including a closed subscriber group identifier (CSG ID) of the target BS,
wherein the local home network identifier corresponding to the source BS is transmitted from the source MME to a target MME.

10. The method of claim 1, further comprising:
transmitting a message to a LGW serving the terminal, wherein the LGW is configured to trigger a deactivation process of a LIPA service.

11. A source base station (BS) in a wireless communication system, the source BS comprising:
a transceiver configured to transmit and receive a signal; and
a controller coupled with the transceiver and configured to:

transmit, to a target BS, first information corresponding to the source BS, the first information including information associated with a local home network and information associated with a sub-network, receive, from the target BS, second information corresponding to the target BS, the second information including information associated with a local home network and information associated with a sub-network, determine to perform a handover of a terminal from the source BS to the target BS, identify whether the local home network identified by the first information and the local home network identified by the second information are same based on the first information and the second information, and release a local internet protocol access (LIPA) packet data network (PDN) connection for the terminal is response to the determination, unless the local home network identified by the first information and the local home network identified by the second information are same.

12. The source BS of claim 11, wherein the second information further includes information on user plane nodes with which the target BS connects.

13. The source BS of claim 12, wherein the controller is further configured to receive a notification message comprising information on a local gateway (LGW) serving the terminal.

14. The source BS of claim 13, wherein the controller is further configured to identify whether to release the LIPA PDN connection for the terminal based on the information on the LGW serving the terminal.

15. The source BS of claim 13, wherein the controller is further configured to:

receive a handover request message in case that the terminal initially accesses the source BS via an S1 handover, and receive a path switch request acknowledgement message in case that the terminal initially accesses the source BS via an X2 handover.

16. The source BS of claim 13, wherein the second information is received in an X2 setup request message.

17. The source BS of claim 13, wherein the controller is further configured to notify an adjacent BS of updated information in case that the second information updates.

18. The source BS of claim 11, wherein the controller is further configured to trigger a deactivation process of a LIPA service based on the first information and the second information, in response to the handover of the terminal.

19. The source BS of claim 11, wherein the controller is further configured to transmit, to a source mobility management entity (MME), a handover request message including a closed subscriber group identifier (CSG ID) of the target BS, and wherein the local home network identifier corresponding to the source BS is transmitted from the source MME to a target MME.

20. The source BS of claim 11, wherein the controller is further configured to transmit a message to a LGW serving the terminal, and wherein the LGW is configured to trigger a deactivation process of a LIPA service.

* * * * *